(No Model.)

E. F. ANDERSON.
HAND FERTILIZER DISTRIBUTER.

No. 588,045. Patented Aug. 10, 1897.

Witnesses.
Robert Errett
F. B. Keefer

Inventor.
Edward F. Anderson.
By James L. Norris
Atty.

THE NORRIS PETERS CO., PHOTO-LITHO., WASHINGTON, D. C.

UNITED STATES PATENT OFFICE.

EDWARD F. ANDERSON, OF GLOSTER, MISSISSIPPI.

HAND FERTILIZER-DISTRIBUTER.

SPECIFICATION forming part of Letters Patent No. 588,045, dated August 10, 1897.

Application filed May 8, 1897. Serial No. 635,662. (No model.)

*To all whom it may concern:*

Be it known that I, EDWARD F. ANDERSON, a citizen of the United States, residing at Gloster, in the county of Amite and State of Mississippi, have invented new and useful Improvements in Hand Fertilizer-Distributers, of which the following is a specification.

This invention relates to hand fertilizer-distributers, and has for its object to provide a simple, inexpensive, and convenient fertilizer-distributer that may be carried and operated by one hand and by means of which the fertilizer may be deposited in such regulated quantities as may be determined by the operator.

To these ends my invention consists in the features and in the construction, arrangement, and combination of parts hereinafter described, and particularly defined in the claims following the description, reference being had to the accompanying drawings, forming a part of this specification, wherein—

Figure 1:
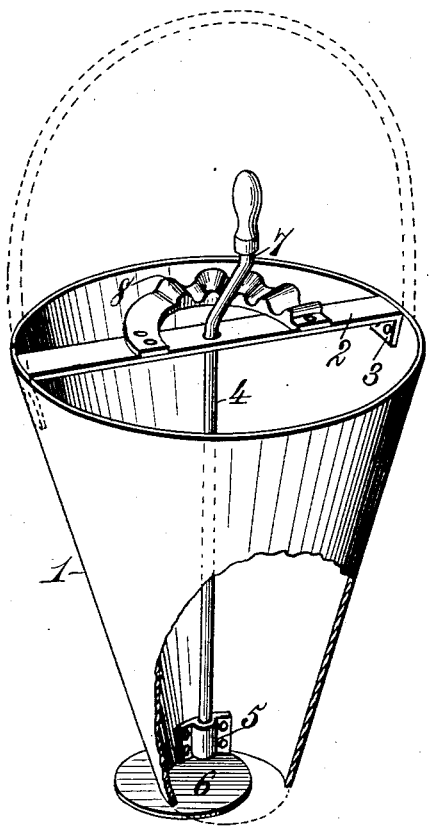
Figure 2:
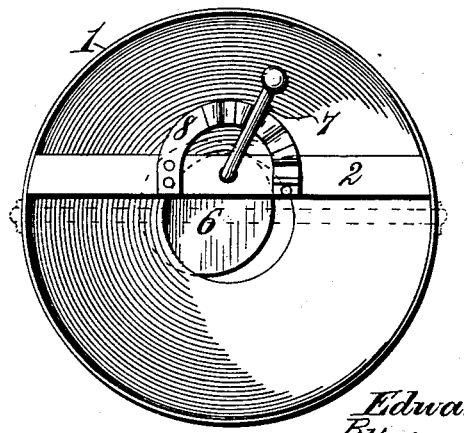

Figure 1 is a perspective view, partially broken away, of my improved fertilizer-distributer; and Fig. 2 is a top plan view thereof.

Referring to the drawings, the reference-numeral 1 indicates a conical vessel, which may be made of any suitable or preferred material and dimensions, though for the sake of lightness and durability I prefer to construct the vessel of sheet metal. Extending across the upper and larger end of the vessel 1 is a combined handle and support 2, consisting of a metallic strap bent at its opposite ends, as at 3, to conform to the configuration of the upper end of the vessel and rigidly affixed by riveting, bolting, or in any other preferred and well-known manner. A rod 4 is journaled at its upper end in the strap 2 and extends down through the vessel and near its lower end is journaled in a bearing 5, attached to the lower inner end of the vessel 1. The lower and smaller end of the vessel constitutes the discharge or outlet of the device and is closed by a disk 6, eccentrically affixed to the lower end of the rod 4. The upper end of the rod 4 is bent to form a crank 7, and said crank engages a segmental rack 8, rigidly attached to the strap 2. The crank in practice possesses sufficient resiliency to permit its being moved over the rack to permit it to engage any one of the grooves or depressions therein, for the purpose hereinafter made apparent.

The operation of my improved fertilizer-distributer is as follows: The rod 4 is turned by its crank 7 to cause the disk or cut-off valve 6 to cover and close the discharge end of the vessel 1, after which the vessel is filled with the fertilizer. The operator grasps the strap or handle 2 with one hand and with the thumb of the same hand turns the crank 7 and partially opens the disk valve 6, thus permitting a portion of the fertilizer to escape into the hill. In the same manner the disk valve is closed and the distributer carried to the next hill and the operation repeated. The hills are successively visited and the operation repeated at each hill. The amount of fertilizer distributed in each hill is regulated by opening the disk valve to a greater or less extent, and the extent to which it is opened is determined by the segmental rack 8, the corrugations or grooves of which hold the disk set at the point to which it is opened until again closed by the operator.

The device is extremely simple, inexpensive, and effective, and may be both carried and operated by one hand, leaving the other hand of the operator free.

In practice the vessel may be held over the hill so as to discharge the fertilizer over the surface of the hill, or the lower end of the vessel may be inserted in the hill so as to deposit the fertilizer within the hill, as circumstances may require or render preferable.

For convenience in carrying to and from the field the vessel may be provided with a bail, as indicated in dotted lines in Fig. 1.

Having described my invention, what I claim is—

1. In a hand fertilizer-distributer, the combination with a conical vessel for containing the fertilizer, of an eccentrically-pivoted disk valve arranged beneath the small discharge end of the vessel, and means for oscillating said valve to open and close said discharge, substantially as described.

2. In a hand fertilizer-distributer, the combination, with a conical vessel 1 for containing the fertilizer and provided at its upper end with a transverse strap 2, of a rod 4 journaled in said strap and in a bearing fixed in one side of the discharge end of the vessel, a handle 7 on the upper end of the rod, and a disk valve 6 eccentrically fixed on the lower end of the rod and closing the discharge end of the vessel, substantially as described.

3. In a hand fertilizer-distributer, the combination with a conical vessel 1 for containing the fertilizer and provided at its upper end with a transverse strap 2, of a rod 4 journaled in said strap and in a bearing fixed in one side of the discharge end of the vessel, a crank 7 on the upper end of the rod, a disk valve 6 eccentrically fixed on the lower end of the rod and closing the discharge end of the vessel, and a segmental rack fixed on the said strap and arranged for engagement with the crank, substantially as described.

In testimony whereof I have hereunto set my hand in presence of two subscribing witnesses.

EDWARD F. ANDERSON.

Witnesses:
J. B. CASON, Jr.,
W. D. JOHNS.